United States Patent
Nagasuna et al.

(10) Patent No.: US 6,335,406 B1
(45) Date of Patent: Jan. 1, 2002

(54) METHOD FOR PRODUCTION OF ABSORBENT RESIN EXCELLING IN DURABILITY

(75) Inventors: Kinya Nagasuna, Himeji; Kenji Kadonaga, Kobe; Kazumasa Kimura, Ikoma; Tadao Shimomura, Toyonaka, all of (JP)

(73) Assignee: Nippon Shokubai Kagaku Kogyo Co., Ltd., Osaka (JP)

(*) Notice: Subject to any disclaimer, the term of this patent is extended or adjusted under 35 U.S.C. 154(b) by 0 days.

(21) Appl. No.: 08/026,167

(22) Filed: Mar. 1, 1993

Related U.S. Application Data

(63) Continuation of application No. 07/682,415, filed on Apr. 8, 1991, now abandoned, which is a continuation of application No. 07/447,926, filed on Dec. 8, 1989, now abandoned.

(30) Foreign Application Priority Data

Dec. 8, 1988 (JP) .......................................... 63-308927

(51) Int. Cl.$^7$ ................................................. C08F 2/00
(52) U.S. Cl. .................... 526/193; 525/107; 525/329.7; 525/329.9; 526/317.1; 526/303.1; 526/310
(58) Field of Search ................................ 526/204, 193; 525/107, 329.7, 329.9

(56) References Cited

U.S. PATENT DOCUMENTS

| | | | | |
|---|---|---|---|---|
| 2,576,720 A | * | 11/1951 | Marks ......................... | 526/233 |
| 2,789,099 A | * | 4/1957 | Rife et al. ..................... | 526/91 |
| 3,661,815 A | | 5/1972 | Smith | |
| 3,828,013 A | * | 8/1974 | Nield .......................... | 526/224 |
| 4,286,082 A | | 8/1981 | Tsubakimoto et al. ....... | 526/240 |
| 4,340,706 A | * | 7/1982 | Obayashi et al. ............ | 526/207 |
| 4,346,202 A | * | 8/1982 | Cohen ......................... | 526/84 |
| 4,497,930 A | * | 2/1985 | Yamasaki et al. ............ | 524/556 |
| 4,524,186 A | * | 6/1985 | Nagase ........................ | 526/329.7 |
| 4,625,001 A | | 11/1986 | Tsubakimoto et al. | |
| 4,683,274 A | * | 7/1987 | Nakamura et al. ........... | 526/216 |
| 4,698,404 A | * | 10/1987 | Cramm et al. ............... | 526/204 |
| 4,755,562 A | * | 7/1988 | Alexander et al. ........... | 525/113 |
| 4,985,514 A | * | 1/1991 | Kimura et al. ............... | 526/88 |
| 5,077,361 A | * | 12/1991 | Hughes et al. ............... | 526/233 |

FOREIGN PATENT DOCUMENTS

| | | |
|---|---|---|
| DE | A 3239476 | 5/1983 |
| EP | A 207714 | 1/1987 |
| JP | SHO 49-43395 | 11/1974 |
| JP | SHO 51-125468 | 11/1976 |
| JP | SHO 52-14689 | 2/1977 |
| JP | SHO 53-15959 | 5/1978 |
| JP | SHO 55-84304 | 6/1980 |
| JP | SHO 63-118375 | 5/1988 |
| JP | SHO 63-152667 | 6/1988 |
| JP | SHO 63-153060 | 6/1988 |
| JP | SHO 63-272349 | 11/1988 |

OTHER PUBLICATIONS

Fred W. Billmeyer, Jr., Textbook of Polymer Science, p. 266, Interscience Publishers, 1966.*

* cited by examiner

*Primary Examiner*—Fred Zitomer
(74) *Attorney, Agent, or Firm*—Burns, Doane, Swecker & Mathis, LLP

(57) ABSTRACT

A method for the production of (D) an absorbent resin excelling in durability, which method comprises polymerizing (A) 30% by weight to saturated concentration of (A) an aqueous water-soluble ethylenically unsaturated monomer solution containing (B) 0.005 to 5 mol % of a cross-linking agent and (C) 0.001 to 1 mol % of a water-soluble chain transfer agent, both based on the amount of said monomer (A), and if necessary, the surface region of the resultant absorbent resin (D) is cross-linked with (E) a hydrophilic cross-linking agent capable of reacting with the functional group of the absorbent resin and an absorbent resin obtained by such method.

13 Claims, 1 Drawing Sheet

METHOD FOR PRODUCTION OF ABSORBENT RESIN EXCELLING IN DURABILITY

This application is a continuation application Ser. No. 07/682,415, filed Apr. 8, 1991, abandoned which is a continuation of application Ser. No. 07/447,926, filed Dec. 8, 1989 abandoned.

BACKGROUND OF THE INVENTION

1. Field of the Invention

This invention relates to a method for the production of an absorbent resin excelling in durability. More particularly, this invention relates to a method for the production of an absorbent resin excelling in absorption capacity, absorption velocity, and durability in the wetted state, suffering only sparingly from ropiness of wetted gel, and excelling in liquid permeability.

Since this absorbent resin not merely enjoys inexpensiveness and simplicity of manufacture and great safety but also exhibits an outstanding performance in water absorption, it is highly useful as sanitary materials for sanitary goods, disposable diapers, etc., as water-retaining agents for agricultural and horticultural devices and afforestation devices, etc., and further as materials for a wide range of absorbent articles.

2. Description of the Prior Art

In recent years, absorbent resins capable of absorbing water in amounts tens to hundreds times as large as their own weights have been developed and have been finding extensive utility in the field of sanitary materials such as disposable diapers and sanitary napkins, in the field of agricultural and horticultural activities, in the field of civil engineering, etc.

The absorbent resins of this class heretofore known in the art include partially neutralized cross-linked polyacrylic acid (Japanese Patent Laid-Open SHO 55(1980)-84,304), a hydrolyzed starch-acrylonitrile graft polymer (Japanese Patent Publication SHO 49(1974)-43,395), a neutralized starch-acrylic acid graft polymer (Japanese Patent Laid-Open SHO 51(1976)-125,468), a saponified vinyl acetate-acrylic ester copolymer (Japanese Patent Laid-Open SHO 52(1977)-14,689), a hydrolyzed acrylonitrile copolymer or acrylamide copolymer (Japanese Patent Publication SHO 53(1978)-15,959), and cross-linked products of such hydrolyzates, for example.

The characteristics which these absorbent resins are desired to possess include a high absorption capacity and a highly satisfactory absorption velocity to be exhibited on contact with an aqueous liquid and a highly satisfactory aspirating force for aspirating an aqueous liquid from a substrate containing the liquid.

Depending on purposes for which these absorbent resins are used, the absorbent resins are required to possess an ability to produce wet gels having durability and stability enough to withstand the effects of aging in addition to the characteristics mentioned above. When a conventional absorbent resin is used as a sanitary material in disposable diapers, for example, the wet gel which the absorbent resin produces on absorption of urine is deteriorated and decomposed by aging. The absorbent resin is also liable to undergo deterioration and decomposition after protracted use in agricultural and horticultural devices.

The methods heretofore known as capable of preventing the wet gel of absorbent resin include a method which causes the absorbent resin to incorporate therein an oxygen-containing reducing inorganic salt or a radical chain inhibitor (Japanese Patent Laid-Open SHO 63(1988)-118,375 and Japanese Patent Laid-Open SHO 63(1988)-152,667), a method which causes the absorbent resin to incorporate therein an oxidizing agent (Japanese Patent Laid-Open SHO 63(1988)-153,060), and a method which causes the absorbent resin to incorporate therein a sulfur-containing reducing agent (Japanese Patent Laid-Open SHO 63(1988)-272,349), for example. These methods invariably rely on the incorporation of a varying additive in the absorbent resin for the prevention of the absorbent resin from deterioration. By reason of the inevitable incorporation of additives, these methods are not necessarily desirable in terms of safety in the light of the fact that the absorbent resin is used as sanitary materials.

There is a method which imparts heightened gel strength and enhanced durability to the absorbent resin by increasing the amount of a cross-linking agent to be used and consequently heightening the cross-link density of the absorbent resin. This method, however, is such that the absorbent resin in its finished state suffers from an extremely low absorption capacity, because of a high cross-link density. Such is the true state of art. An absorbent resin which excels in safety, exhibits a high absorption capacity, and possesses outstanding durability remains yet to be developed.

In addition to the inferior durability mentioned above, the ropiness of the wet gel and the degradation of liquid permeability which occur when the absorbent resin is incorporated in a diaper have often, if not always, raised a problem. The absorbent resin sometimes contains a portion of the resin to be soluble in water (hereinafter referred to as a "water-soluble portion"). This water-soluble portion imparts ropiness to the wet gel which the absorbent resin produces on absorption of aqueous liquid. When the absorbent resin is incorporated in such an absorbent article as a disposable diaper, this ropiness impairs the liquid permeability to the resin. The diaper, therefore, has a disadvantage that freshly discharged urine leaks from the diaper, for example. Since the content of the water-soluble portion in the absorbent resin is directly proportional to the absorption capacity of the resin, however, such a decrease in the content of the water-soluble portion inevitably entails an increase in the cross-link density of the absorbent resin. Thus, the absorbent resin having a small content of the water-soluble portion exhibits a proportionately low absorption capacity.

The absorbent resin has been known in the art to be such that the durability thereof is improved in proportion as the amount of the cross-linking agent incorporated therein is increased. Further, a technique for enhancing absorption capacity has been disclosed by using a chain transfer agent when the absorption resin is produced (U.S. Pat. No. 4,698,404). It, however, has the problem that the absorption capacity thereof is degraded in proportion as the content of the cross-linking agent is certainly increased. When a chain transfer agent is used in the production of the absorbent resin, it improves the absorption capacity of the absorbent resin with respect to water or physiological saline solution and brings about virtually no discernible improvement in the absorption capacity with respect to human urine.

An object of this invention, therefore, is to provide a method for the production of an absorbent resin excelling in durability.

Another object of this invention is to provide a method for the production of an absorbent resin which exhibits a high absorption capacity with respect to urine as well as to physiological saline solution, displays outstanding durability while in use in a disposable diaper, suffers only sparingly from back flow of absorbed urine in the diaper, gives rise to a wet gel of scanty ropiness, and excels in perviousness to liquid.

SUMMARY OF THE INVENTION

The objects described above are accomplished by a method for the production of (D) an absorbent resin excelling in durability, which method comprises polymerizing an aqueous solution containing 30% by weight to saturated concentration of (A) an aqueous water-soluble ethylenically unsaturated monomer solution containing (B) 0.005 to 5 mol % of a cross-linking agent and (C) 0.001 to 1 mol % of a water-soluble chain transfer agent, both based on the amount of the monomer (A).

The objects are further accomplished by a method for the production of (F) an absorbent resin excelling in durability, which method comprises polymerizing an aqueous 30% by weight to saturated concentration of (A) an aqueous water-soluble ethylenically unsaturated monomer solution containing (B) 0.005 to 5 mol % of a cross-linking agent and (C) 0.001 to 1 mol % of a water-soluble chain transfer agent, both based on the amount of the monomer (A) thereby preparing (D) an absorbent resin and cross-linking the surface region of the absorbent resin with (E) a hydrophilic cross-linking agent capable of reacting with the functional group of the absorbent resin.

The absorbent resin which is obtained by this invention, unlike that obtained by the conventional method, (a) excels in durability of wet gel, (b) exhibits a high absorption capacity particularly with respect to human urine and contains a soluble portion of low molecular weight, (c) enjoys a notable improvement in freedom ropiness of wet gel and liquid permeability, and (d) proves itself to be safe. In accordance with the method of this invention, the absorbent resin of such excellent quality can be manufactured simply by polymerizing (A) a water-soluble ethylenically unsaturated monomer in the presence of (B) a specific amount of a cross-linking agent and (C) a specific amount of a water-soluble chain transfer agent. The absorbent resin (F) can be obtained with notable improvement in absorption velocity and durability by cross-linking the surface region of the absorbent resin (D) with (E) a specific hydrophilic cross-linking agent. Since the absorbent resin can be produced inexpensively and possesses heretofore unattainable excellent absorption characteristics, it is useful extensively in the fields of sanitary materials, food processing materials, materials for civil engineering, and materials for agriculture, for example.

The absorbent resin of this invention and the method for the production thereof enjoys the following characteristic features.

(1) Heretofore, it has been customary to decrease the content of the cross-linking agent in the polymerization mixture for the purpose of enabling the produced absorbent resin to acquire a high absorption capacity. The wet gel of this absorbent resin, therefore, is deficient in durability. In accordance with the method of this method, the produced absorbent resin possesses a high absorption capacity particularly with respect to human urine even when the cross-linking agent is used in a large amount. The wet gel, therefore, exhibits outstanding durability.

(2) Even when the monomer to be used is polymerized in a high concentration near its saturated concentration, since such unnecessary reactions as self-crosslinking are suppressed and the absorbent resin is obtained with high performance, the monomer can be polymerized in a high concentration and the absorbent resin can be manufactured with high productivity.

(3) The absorbent resin of the present invention has a low molecular weight in the water soluble portion which automatically occurs in the absorbent resin and, therefore, exhibits low viscosity, the soluble portion is incapable of producing such adverse effects as impartation of ropiness to the wet gel and degradation of perviousness of the resin to liquid.

(4) The cross-linking of the surface region of the absorbent resin contemplated by the present invention is so effective in improving absorption characteristics to the extent never attained in the surface cross-linking of the conventional absorbent resin that the absorbent resin undergone the cross-linking treatment exhibit further improved durability and absorption velocity.

(5) In accordance with the conventional method, when the amount of the polymerization initiator is increased for the purpose of decreasing the unaltered monomer content and shortening the induction period and the polymerization time, the absorbent resin cannot be produced with a high absorption capacity because the polymerization entails such unnecessary reactions as self-crosslinking. In accordance with the method of this invention, the absorbent resin can be obtained with a high absorption capacity and a low unaltered monomer content even when the amount of the polymerization initiator is increased.

EXPLANATION OF THE PREFERRED EMBODIMENT

Figure 1:
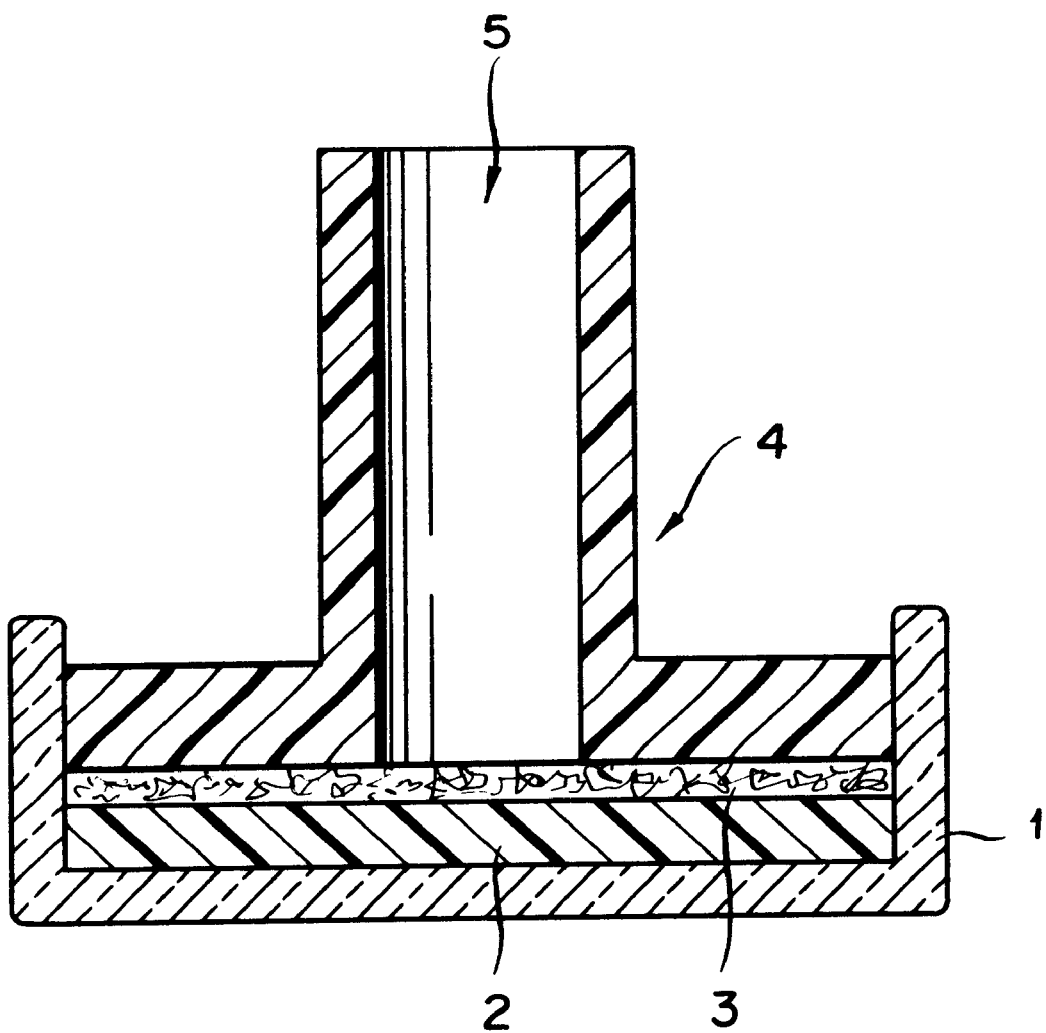
FIG. 1 is a cross-sectional view of a device for measuring liquid permeability of swelled gel.

Now, the present invention will be described more specifically below.

In the present invention, the production of the absorbent resin from the aqueous solution of a monomer is attained, for example, by the radical polymerization using a radical polymerization initiator or the polymerization using an activation energy such as ultraviolet light or electron beam. For the absorbent resin to be produced with excellent performance, the production is desired to be effected by the radical polymerization using a radical polymerization initiator.

The radical polymerization to be effected for the production of the absorbent resin (D) by the use of a radical polymerization initiator may be carried out by any of the known processes such as, for example, aqueous solution polymerization, reversed-phase suspension polymerization, precipitation polymerization, cast polymerization, polymerization on a belt conveyor, and bulk polymerization. Among other processes mentioned above, aqueous solution polymerization and reversed-phase suspension polymerization prove to be particularly desirable ways of obtaining the absorbent resin advantageous in performance and cost. The methods for performing the aqueous solution polymerization or the reversed-phase suspension polymerization include a method for cast polymerization to be carried out within a mold (Japanese Patent Publication SHO 48(1973)-42,466), and a method for performing the polymerization on a belt conveyor (Japanese Patent Laid-Open SHO 58(1983)-49,714).

First, the present invention, i.e., a method for the production of (D) an absorbent resin excelling in durability, will be described according to an aqueous solution polymerization, for example, a method for carrying out the polymerization as in a kneader provided with stirring blades capable of finely dividing a hydrated gel-like polymer (Japanese Patent Laid-Open SHO 57(1982)-34,101).

The water-soluble ethylenically unsaturated monomer (A) to be used in the present invention (hereinafter referred to as "monomer (A)) is possessed of a functional group. The compounds which are usable as a "monomer (A)" include acrylic acid, methacrylic acid, maleic acid, fumaric acid, crotonic acid, itaconic acid, vinylbenzene sulfonic acid, 2-(meth)acrylamide-2-methylpropane sulfonic acids, 2-(meth)acryloylethane sulfonic acids, 2-(meth)acryloylpropane sulfonic acids, and alkali metal salts and ammonium salts of such acids, acrylamide, methacrylamide, 2-hydroxyethyl(meth)acrylates, methoxypolyethylene glycol(meth)acrylates , N,N-dimethylaminoethyl(meth)acrylates, N,N-dimethylaminoethyl(meth)acrylates, N,N-diethylaminopropyl(meth)acrylates, N,N-diethylaminopropyl(meth)acrylamides, and quaternary salts thereof, for example. At least one member selected from the group of these compounds is used as the "monomer (A)."

From the standpoint of the performance of the produced absorbent resin and the cost of production, it is particularly preferable to use acrylic acid as a main component among other examples of the "monomer (A)" mentioned above. In this case, the content of acrylic acid and an alkali metal salt and/or ammonium salt thereof in the monomer (A) is preferable to be not less than 50% by weight, preferably not less than 75% by weight.

In the present invention, for the absorbent resin to be obtained with outstanding durability, it is required to use, in a specific amount, (B) the cross-linking agent possessing at least two polymerically unsaturated groups or reactively functional groups in the molecular unit thereof. The compounds possessing at least two polymerically unsaturated groups in the molecular unit thereof and usable as the cross-linking agent (B) include N,N'-methylenebisacrylamide, (poly)ethylene glycol di(meth)acrylates, (poly)propylene glycol di(meth)acrylates, glycerol tri(meth)acrylates, glycerol acrylate methacrylate, polyvalent metal salts of (meth)acrylic acids, trimethylol propane tri(meth)acrylates, triallylamine, triallyl cyanurate, triallyl isocyanurate, and triallyl phosphate, for example. The compounds possessing at least two reactively functional groups and usable as the cross-linking agent (B) where the water-soluble unsaturated monomer (A) possesses a carboxyl group include polyhydric alcohols such as ethylene glycol, diethylene glycol, triethylene glycol, polyethylene glycol, propylene glycol, dipropylene glycol, polypropylene glycol, and glycerol, polyglycidyl compounds such as (poly) ethylene glycol diglycidyl ether and glycerol polyglycidyl ether, polyamine compounds such as ethylene diamine and polyethylene imine, polyoxazoline compounds, haloepoxy compounds, polyisocyanates, and polyvalent metal salts, and there are also glycidyl (meth)acrylate, N-methylol (meth)acrylamide as compounds both having polymerizable unsaturated group and a reactive functional group, for example. In these cross-linking agents (B), those which possess at least two polymerically unsaturated groups in the molecular unit thereof prove to be particularly preferable.

The amount of the cross-linking agent (B) is 2 to 100 mol times, preferably 4 to 10 mol times compared with the amount of the cross-linking agent when the same polymerization condition except that the water-soluble chain transfer agent (C) is not used for obtaining the absorbent resin have the desired absorption capacity. Concretely, the amount of the cross-linking agent (B) to be used is in the range of 0.005 to 5 mol %, based on the amount of the monomer (A). If the amount of the cross-linking agent (B) to be used is less than 0.005 mol %, the produced absorbent resin, though enjoying a high absorption capacity, suffers from inferior durability and an unduly high content of the water-soluble portion and high molecular weight, and betrays heavy ropiness and poor liquid permeability. If this amount exceeds 5 mol %, the absorbent resin exhibits an unduly low absorption capacity. The amount of the cross-linking agent (B) to be used is generally in the range of 0.02 to 1 mol %, preferably 0.02 to 0.4 mol %, more preferably 0.04 to 0.2 mol % though variable with the amount of the water-soluble chain transfer agent (C) which will be described specifically hereinafter.

For this invention, it is an indispensable requirement that the water-soluble chain transfer agent (C) should be used in a specific amount. In this invention, the absorbent resin (D) obtained by the polymerization therefore, using a specific amount of the water-soluble chain transfer agent (C) and 2 to 100 mol times of large amount of the cross-linking agent (B) compared with a conventional method, excels in durability and manifests a high absorption capacity not only for saline but also for human urine.

The water-soluble chain transfer agent (C) to be used in the present invention has no particular restriction except for the sole requirement that it should be soluble in water or a water-soluble ethylenically unsaturated monomer. The compounds which are usable as (C) the water-soluble chain transfer agent include thiols, thiolic acids, secondary alcohols, amines, and hypophosphites, for example. More specifically, they are mercaptoethanol, mercaptopropanol, dodecyl mercaptan, thioglycols, thiomalic acid, 3-mercaptopropionic acid, isopropanol, sodium hypophosphite, formic acid, and salts thereof. One member or a mixture of two or more members selected from the group of compounds mentioned above is used. From the standpoint of effect, it is particularly desirable to use sodium hypophosphite.

The amount of (C) the water-soluble chain transfer agent to be used, though variable with kind and the amount of use of the water-soluble chain transfer agent and the concentration of (A) the monomer in the aqueous solution thereof, generally falls in the range of 0.001 to 1 mol %, preferably 0.005 to 0.3 mol %, based on the amount of (A) the monomer. If this amount is less than 0.001 mol %, since the water-soluble portion thereof has a high molecular weight and exhibits high viscosity, the wet gel assumes a ropy constituent and manifests a liquid permeability and, where (B) the cross-linking agent of this invention is used in the specified amount according with this invention, entails a disadvantage that the cross-link density is unduly high and the absorption capacity is unduly low. If (C) the water-soluble chain transfer agent is used in an amount exceeding 1 mol %, there arises a disadvantage that the water-soluble portion is unduly large and the durability unduly low.

The concentration of (A) the monomer in its aqueous solution for use in the present invention is in the range of 30% by weight to saturated concentration, preferably 35% by weight to saturated concentration. If this concentration is less than 30% by weight, there ensues an economic disadvantage that the productivity of the polymerization per unit volume of the reaction system is inferior and the time required for the step of drying is unduly long. In accordance with the conventional method of polymerization, when the monomer for the polymerization is used in an amount approximating its saturated concentration for the purpose of improving the productivity, the polymerization entails such unnecessary reactions as self-crosslinking and impairs the absorption capacity and, as the result, the amount of (B) the cross-linking agent usable during the polymerization is limited and the produced absorbent resin is consequently deficient in durability. In accordance with the method of this invention, the absorbent resin can be produced with excellent durability in a high concentration with high productivity because the self-crosslinking reaction is suppressed by suitably selecting the amount of (C) the water-soluble chain transfer agent to be used and the amount of (B) the cross-linking agent to be used is allowed to increase.

The aqueous solution of (A) the monomer, when necessary, may further incorporate therein a thickener. The thickeners which are usable in the aqueous solution include polyvinyl pyrrolidone, polyacrylamide, methyl cellulose, and hydroxyethyl cellulose, for example.

The radical polymerization initiator to be used herein has no particular restriction except for the sole requirement that it should be soluble in water. The compounds which are usable as the radical polymerization initiator include persulfates such as potassium persulfate, ammonium persulfate, and sodium persulfate; hydroperoxides such as t-butyl hydroperoxide and cumene hydroperoxide; azo compounds such as 2,2-azobis(2-amidinopropane) dihydrochloride; and ceric salts, and permanganates, for example. From the standpoint of the performance of the produced absorbent resin and the safety of the product of decomposition, it is particularly preferable to use at least one member selected from the group consisting of persulfates, hydrogen peroxide, and azo compounds among other radical polymerization initiators enumerated above.

Where the radical polymerization initiator is an oxidizing radical polymerization initiator, it may be combined with a reducing agent and used as a redox type initiator. The reducing agents which are usable for this combined use include (hydrogen) sulfites such as sodium sulfite and sodium hydrogen sulfite; thiosulfates such as sodium thiosulfate; dithionites; metal salts such as cuprous sulfate and ferrous sulfate; organic reducing agents such as 1-ascorbic acid; and amines such as aniline and monoethanol amine, for example.

The amount of the radical polymerization initiator, though variable in a wide range, is generally in the range of 0.001 to 2 mol %, preferably 0.01 to 0.5 mol %, based on the amount of the monomer (A). If this amount is less than 0.001 mol %, there ensues a disadvantage that the time and the induction period are elongated. In accordance with the conventional method of polymerization, the amount of the polymerization initiator to be used is limited because such unnecessary reactions as self-crosslinking occur and the absorption capacity is degraded when the amount of the initiator is increased for the purpose of decreasing the unaltered monomer content and shortening the induction period and the polymerization time. In accordance with the method of the present invention, the drawbacks of the conventional method are precluded and the absorbent resin is obtained with high performance even when the amount of the polymerization initiator is increased. If the amount of the polymerization initiator is increased beyond 2 mol %, the effect obtained proportionately to the excess is small and the control of the polymerization reaction is obtained only with difficulty.

When the polymerization is to be carried out in the form of aqueous solution polymerization, the heat of polymerization is preferable to be uniformly removed for the purpose of obtaining the absorbent resin with excellent performance.

Thus, the method used for, the polymerization is not preferable to be such that the polymer gel is suffered to collect into one mass but such that, throughout the entire period between the beginning to the end of polymerization or in part of the period, the polymer gel in the reaction system is kept stirred to, permit uniform radiation of the heat of polymerization. The reaction of polymerization, therefore, is preferable to be carried out in a reaction vessel provided with (1) a rotary stirring blade. Though the reaction vessel provided with a rotary stirring blade is not particularly restricted, it is preferable to generate a large stirring force in the polymer gel. A reaction device which is adapted to impart the shearing force of a rotary stirring blade to the polymer gel to be formed with the progress of polymerization may be cited as an example. For the stirring force to be large, the rotary stirrer is preferable to use a plurality of blades. The reaction devices which are usable for the polymerization include a uniaxial mixer, a uniaxial extruder, a twin-arm type kneader, and a triaxial kneader, for example. Among other reaction devices mentioned above, the twin-arm type kneader proves to be particularly preferable because it is capable of finely and uniformly stirring the polymer gel and permitting uniform radiation of the heat of polymerization and, therefore, producing an absorbent resin with excellent performance.

Besides the method using the cross-linking agent (B) mentioned above, a method which effects the formation of a cross-link by graft polymerization may be additionally used. Specifically, this method comprises polymerizing an aqueous solution of the monomer (A) in the presence of a hydrophilic macromolecular compound such as cellulose, starch, or polyvinyl alcohol, for example, thereby attaining the formation of a cross-link due to the ensuing graft polymerization. The water-soluble macromolecular compound is desired to be used in an amount in the range of 1 to 50%, based on the amount of the monomer (A).

Secondly, the present invention will be described according to a reversed-phase suspension polymerization, for example, a method for reversed-phase suspension polymerization to be carried out in an organic solvent (Japanese Patent Publication SHO 59(1984)-37,003).

The water-soluble ethylenically unsaturated monomer (A), the cross-linking agent (B), the water-soluble chain transfer agent (C), and the radical polymerization initiator, and the amounts to be used are the same as that described in the section of the aqueous solution polymerization.

When the reversed-phase suspension polymerization in (2) an organic solvent is carried out, it is allowed to produce the absorbent resin with still better performance because the polymer gel is finely and uniformly stirred and the heat of polymerization is uniformly radiated.

The hydrophobic organic solvents which are usable in the reversed-phase suspension polymerization include aliphatic hydrocarbons such as n-pentane, n-heptane, and n-octane; alicyclic hydrocarbons such as cyclohexane, cyclooctane, methylcyclohexane, and decalin; and aromatic hydrocarbons such as benzene, ethylbenzene, toluene, and xylene, for example. One member or a mixture of two,or more members selected from the group of hydrophobic organic solvents mentioned above can be used. Among other hydrophobic organic solvents enumerated above, n-hexane, n-heptane, cyclohexane, methyl cyclohexane, toluene, and xylene prove to be particularly preferable. With due respect to the removal of the heat of polymerization, the control of temperature, and the safety of the dispersion, the ratio of the amount of the hydrophobic organic solvent to that of (A) the monomer is proper generally in the range of 1:1 to 4:1.

Dispersants which are usable in the reversed-phase suspension polymerization performed in (2) the organic solvent as described above include nonionic surfactants such as sorbitan fatty acid esters, sucrose fatty acid esters, and polyglycerol fatty acid esters; cellulose derivatives such as cellulose esters and cellulose ethers; and carboxy group-containing macromolecular compounds such as copolymers of α-olefins with maleic anhydride and derivatives thereof, for example. One member or a mixture of two or more members selected from the group of these compounds can be used herein. Among other compounds mentioned above, nonionic surfactants having HLB in the range of 2 to 7 more preferably sorbitune fatty acid, esters having HLB in the range of 2 to 7, prove to be particularly preferable.

In the production of the absorbent resin in the present invention, the monomer for polymerization may be subjected in a high concentration to polymerization and the heat of polymerization may be utilized simultaneously for drying and polymerization. Depending on the water content of the hydrated gel resulting from the polymerization, the absorbent resin fit for actual use may be obtained by further drying the gel. The drying of the dehydrated gel can be carried out by any of the conventional methods available for drying such as, for example, a method which attains the drying by azeotropic dehydration in an organic solvent and a method which attains the drying by the use of a forced air furnace, a vacuum drier, a microwave drier, an infrared drier, a belt heated to a prescribed temperature, or a drum drier. The hydrated gel resulting from the polymerization is desired to be dried by such a method of drying mentioned above, at a temperature exceeding 80° C., preferably falling in the range of 80° to 230° C. If this temperature is lower than 80° C., there arises a disadvantage that the time spent for drying is so much as to impair productivity. If this temperature exceeds 230° C., attention should be paid to precluding the absorbent resin from being deteriorated.

The absorbent resin which has been polymerized and dried as described above, when necessary, is pulverized and/or classified and then put to use.

This invention further provides a method for the production of an absorbent resin (E) obtained by a procedure of causing the surface region of the absorbent resin (D) obtained by the method of production described above to be cross-linked with a hydrophilic cross-linking agent (E). The absorbent resin (F) obtained by the method just described manifests a marked effect of the cross-linking of the surface region in the improvement of absorption characteristics as compared with the conventional absorbent resin. The absorbent resin having the surface region thereof already cross-linked exhibits better durability and more desirable absorption characteristics than the absorbent resin not having the surface region thereof cross-linked yet. Further, the absorbent resin (F) of this invention is excellent in respect that the water-soluble portion thereof has a low molecular weight and low viscosity and only sparingly brings about such adverse effects as impartation of ropiness to the wet gel and degradation of liquid permeability.

The hydrophilic cross-linking agent (E) to be used in the present invention is (E-1) a compound containing in the molecular unit thereof at least two functional groups capable of reacting with the functional group in the absorbent resin (D) and/or (E-2) a polyvalent metal salt compound. When the absorbent resin (D) possesses carboxyl groups, for example, the compounds which are usable as (E-1) the compound include polyhydric alcohol compounds such as ethylene glycol, diethylene glycol, triethylene glycol, tetraethylene glycol, polyethylene glycol, 1,4-butane diol, 1,5-pentane diol, 1,6-hexane diol, neopentyl glycol, propylene glycol, glycerol, polyglycerol, propylene glycol, trimethylol propane, pentaerythritol, sorbitol, and polyvinyl alcohol; polyglycidyl ether compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether; polyamine compounds such as ethylene diamine, diethylene triamine, triethylene tetramine, and polyethylene imine; polyoxazoline compounds such as 1,2-ethylenebisoxazoline and polyisopropenyl oxazoline; haloepoxy compounds such as epichlorohydrin; polyaziridine compounds, and polyisocyanate compounds, for example. The compounds which are usable as (E-2) the polyvalent metal salt include hydroxides and chlorides of zinc, calcium, magnesium, aluminum, iron, and zirconium, for example. It is preferable to use one member or a mixture of two or more members selected from the group of compounds mentioned above. It is particularly desirable to use, essentially, one member or a mixture of two or more members selected from the group of compounds designated as (E-1) herein. From the standpoint of the effect of surface cross-linking, it is particularly preferable to use a polyhydric alcohol, a polyglycidyl compound, or a polyamine as the hydrophilic cross-linking agent (E). It is permissible to use a compound (E-1) and a polyvalent metal compound (E-2) together.

The amount of the hydrophilic cross-linking agent (E) to be used in this invention is in the range of 0.005 to 5 part by weight, preferably 0.01 to 1 parts by weight, based on 100 parts by weight of the absorbent resin (D) obtained by the method of production described above. So long as this amount is in the range specified above, the absorbent resin having a cross-linked surface region is obtained with excellent absorption characteristics. If this amount exceeds 5 parts by weight, the excess not only renders the reaction uneconomical but also opens up the possibility of the produced absorbent resin (F) retaining therein the unaltered portion of the hydrophilic cross-linking agent (E) and, moreover, entails a disadvantage that the effect of cross-linking is manifested excessively and the produced absorbent resin (F) acquires only a small absorption capacity. If the amount is less than 0.005 part by weight, the effect of this invention is attained only with difficulty.

In the present invention, water may be used in the mixing of the absorbent resin (D) with the hydrophilic cross-linking agent (E). This water functions not only to accelerate uniform dispersion of the hydrophilic cross-linking agent (E) on the surface of the absorbent resin (D) and permeation of the cross-linking agent (E) in the absorbent resin (D) but also to promote the cross-linking reaction in (D) the absorbent resin. When the polyvalent metal compound (E-2) is used as the hydrophilic cross-linking agent (E), the water functions to accelerate the reaction of (E) the hydrophilic cross-linking agent with the absorbent resin (D). Thus, the use of the water, proves to be advantageous for this invention.

In the present invention, the water, depending on the kind and the particle size of the absorbent resin (D), is used in an amount of not more than 20 parts by weight, preferably in the range of 0.5 to 10 parts by weight, based on 100 parts by weight of the absorbent resin (D). If the amount of water to be used exceeds 20 parts by weight, there ensues a disadvantage that the time spent for the heat-treatment is unduly long and the produced absorbent resin exhibits an intolerably low absorption capacity, the hydrophilic cross-linking agent (E) is suffered to permeate to the core of the absorbent resin (D) and, during the mixture of the absorbent resin (D) with the hydrophilic cross-linking agent (E) and water, the resultant mixture is liable to form wet clusters and assume an ununiform constitution. Optionally in this case, the water may be used in the form of steam.

In this invention, a hydrophilic organic solvent (G) may be used in the mixing of the cross-linking agent (E) with the absorbent resin (D). The hydrophilic organic solvent (G) is expected to ensure uniform dispersion of the hydrophilic cross-linking agent (E) (and water) on the surface of the absorbent resin (D). Thus, the hydrophilic organic solvent (G) has no particular restriction except for the requirement that it should be uniformly mixed with the hydrophilic cross-linking agent (E) and should avoid adversely affecting the performance of the produced absorbent resin (F). The compounds which are usable as the hydrophilic organic solvent (G) include lower alcohols such as methanol, ethanol, n-propanol, iso-propanol, n-butanol, iso-butanol, and t-butanol; ethers such as acetone, methylethyl ketone, and methylisobutyl ketone; ketones such as dioxane and tetrahydrofuran; amides such as N,N-dimethyl formamide; and sulfoxides such as dimethyl sulfoxide, for example.

The amount of the hydrophilic organic solvent (G) to be used in this invention, through variable with the kind and the particle size of the absorbent resin powder, is generally in the range of 0 to 20 parts by weight, preferably 0 to 8 parts by weight, based on 100 parts by weight of the absorbent resin (D). If the amount of the hydrophilic organic solvent (G) to be used exceeds 20 parts by weight, the excess is not particularly recognized to produce a proportionate addition to the effect but rather is found to bring about an economic disadvantage that the energy required for drying is increased and the amount of the hydrophilic organic solvent (G) to be used is increased.

In the present invention, the mixing of the absorbent resin (D) with the hydrophilic cross-linking agent (E) and optionally water and/or the organic solvent (G) to be used is increased.

In the present invention, the mixing of the absorbent resin (D) with the hydrophilic cross-linking agent (E) and optionally water and/or the organic solvent (G) can be carried out by either of the following methods.

(I) A method which effects this mixing by either spraying or dropping the hydrophilic cross-linking agent (E) optionally in conjunction with water and/or the hydrophilic organic solvent (G) onto the absorbent resin (D).

The mixing device to be used for the mixing is desired to have a large mixing force to ensure uniformity of the mixing. Any of the conventional mixing machines and kneading machines can be used as the mixing device. The mixing devices which are usable herein include cylindrical mixer, double-cone type mixer, V-shaped mixer, ribbon type mixer, screw type mixer, fluidization type mixer, rotary disk type mixer, air current type mixer, twin-arm type kneader, intermixer, muller type mixer, roll mixer, and screw type extruder, for example.

(II) A method which accomplishes the mixing by dispersing and suspending the absorbent resin (D) a polymerically inactive hydrophobic organic solvent and adding to the resultant suspension the hydrophilic cross-linking agent (E) optionally in conjunction with water and/or the hydrophilic organic solvent (G) as kept stirred. Desirably, this method specifically comprises emulsifying and suspending the hydrophilic cross-linking agent (E) in a hydrophobic organic solvent with the aid of a specific surfactant and adding the resultant emulsion to the suspension of the absorbent resin (D).

For the heat-treatment to be performed on the mixture prepared by mixing the absorbent resin powder obtained by the method of this invention with the hydrophilic cross-linking agent (E) optionally in conjunction with water and/or the hydrophilic organic solvent, any of the conventional heating devices and heating furnaces may be used. The heaters which are usable herein include groove type stirring drier, rotary drier, disk type drier, fluidized-bed drier, air current drier, infrared drier, and induction heating drier, for example. Optionally, in the method of (II), after the cross-linking agent (E) is added in the organic solvent to the absorbent resin, the resultant mixture as held in the organic solvent may be set reacting by heating.

The temperature of the heat-treatment, though variable with the kind of the hydrophilic cross-linking agent (E) to be used, is generally in the range of 40° to 250° C., preferably 90° to 220° C. If this temperature is lower than 40° C., there ensues a disadvantage that the time spent for the reaction is so long as to degrade productivity and part of the hydrophilic cross-linking agent (E) persists in the unaltered state in the produced absorbent resin. If this temperature exceeds 250° C., care should be taken to preclude the possibility of the absorbent resin powder undergoing thermal deterioration.

The absorbent resin (F) having a cross-linked surface region and the absorbent resin (D) having no cross-linked surface region, when necessary, may be pulverized and pelletized. The pulverization and pelletization may be carried out by any of the conventional methods. The devices which are usable therefor include New Speed Mill (produced by Okada Seiki K.K.), Flush Mill (Fuji Powder K.K.), and Speed Mill (Showa Engineering K.K.), for example.

For more specific illustration of the present invention, the following examples are presented which are intended to be merely illustrative of and not in any sense limitative of the invention. The numerical values of various physical properties of absorbent resin mentioned in the working examples were determined by the following testing methods.

(1) Absorption Capacity with Respect to Physiological Saline Solution:

This property was determined by immersing a 1.0-g absorbent resin sample in 150 ml of an aqueous solution containing 0.9% by weight of sodium chloride and held in a beaker, slowly stirring the resin in the aqueous solution with a magnetic stirrer for six hours, separating the swelled gel by passing the stirred aqueous solution through a metallic gauze, thoroughly draining the separated swelled gel, weighing the swelled gel, and calculating the absorption capacity in accordance with the following formula.

$$\text{Absorption capacity (g/g)} = \frac{\text{(Weight of swelled gel)}}{\text{(Weight of absorbent resin)}}$$

(2) Absorption Capacity with Respect to Human Urine:

This property was determined by following the procedure of (1) above, except that the human urine combining the samples from 10 male adults was used in the place of the physiological saline solution.

(3) Water-soluble Portion:

This property was determined by dispersing a 0.5-g absorbent resin sample in 1,000 ml of deionized water, allowing the resultant dispersion to stand for 12 hours, then passing the dispersion through a filter paper, weighing the solid component in the filtrate, and calculating the water-soluble portion in accordance with the following formula.

Water-soluble portion (%)=Weight of filtrate (g)×solid portion (%) of filtrate/0.5 (g)

(4) Molecular Weight of Water-soluble Portion:

This property was determined by subjecting the water-soluble portion obtained by the method of (3) to gel permeation chromatography, based on varying sodium polyacrylates of known molecular weights as standards.

(5) Durability of Swelled Gel:

This property was determined by securing a half cut of a commercially available child's diaper comprising non-woven fabric, cotton pulp, absorbent paper, and waterproof film (72 g in weight), scattering a 2.5-g polymer sample uniformly between the cotton pulp and the absorbent paper in the cut diaper, adding to the cut diaper 120 ml of adult urine, allowing the diaper containing the urine to stand at 37° C., opening the diaper after intervals of 6 hours, 12 hours, and 18 hours, examining the swelled gel as to the possible effect of aging on the swelled gel, and rating the degree of deterioration on the three-point scale (o-Δ-×), wherein o stands for perfect retention of the original shape of the swelled gel, Δ for partial collapse of the original shape of the swelled gel, and × for complete collapse of the original shape of the swelled gel and consequent assumption of dopy fluidity.

(6) Amount of Back Flow:

This property was determined by superposing 10 two-fold paper towels 23 cm×23 cm in area on the non-woven fabric of the child's diaper after 18 hour's standing in the test of the swelled gel for durability described above, keeping the paper towels under a pressure of 40 g/cm$^2$ for one minutes, and measuring the amount of urine which flowed back to the paper towels during the application of pressure.

(7) Stickiness of Swelled Gel:

This property was determined by evaluating the stickiness (dryness) of the swelled gel which had undergone the test for absorption capacity by tough with a finger tip and rating the result of evaluation on the three-point scale (o-Δ-×), wherein o stands for fair freedom of flow and sensation of dryness of the swelled gel, Δ for partial stickiness of the swelled gel, and × for heavy stickiness of the swelled gel such as to impart slipperiness to the examiner's hand.

(8) Liquid Permeability of Swelled Gel:

As shown in FIG. 1, this property was determined by placing a 1.0-g absorbent resin sample in a petri dish 1 having 53 mm of inner diameter to obtain a swelled gel 2, pouring 10 ml of human urine onto the swelled gel 2 superposing a disk of paper towel 3 having 53 mm of diameter on the swelled gel 2, then superposing a tester 4 of acryllic resin illustrated below comprising a disk portion and a cylindrical portion which is provided vertically, on the disk of paper towel as shown in FIG. 1, allowing the resultant setup to stand at normal room temperature for one hour, introducing 6 ml of human urine into the tester through an inlet 5, clocking the time required for the human urine to be completely absorbed in the swelled gel, and reporting the time as the magnitude of permeability of the swelled gel.

EXAMPLE 1

An aqueous solution of monomer having a monomer concentration of 35% and a neutralization ratio of 75% was obtained from 21.6 g of acrylic acid, 228.6 g of an aqueous 37 wt % sodium acrylate solution, 0.0925 g of N,N'-methylenebisacrylamide (0.05 mol % based on monomer), 0.064 g of sodium hypophosphite monohydratre (hereinafter referred to as "SHP") (0.05 mol % based on monomer) as a water-soluble chain transfer agent (C), and 53 g of deionized water. This aqueous monomer solution was deprived of dissolved oxygen by dissolving 0.15 g of potassium persulfate therein and blowing nitrogen gas therein.

In a four-neck separable flask having an inner volume of 1 liters and provided with a stirrer, a reflux condenser, a thermometer, a nitrogen gas inlet, and a dropping funnel, 1.0 liter of cyclohexane was placed, 3.0 g of sorbitan monostearate (HLB 4.7) was added thereto as a dispersant and dissolved therein, and nitrogen gas was blown in the resultant solution to expel dissolved oxygen therefrom.

Then, the monomer mentioned above was added to the separable flask and stirred at 230 rpm to be dispersed in the solution. The resultant solution was then heated to 65° C. to start polymerization reaction and held at this temperature for two hours to complete the polymerization. The resultant polymerization solution was azeotropically dehydrated for removal of the substantial part of the water content thereof. The residue of the dehydration was filtered and further dried at 100° C. under a vacuum, to obtain an absorbent resin (1).

The absorbent resin (1) thus obtained was tested for absorption capacity with respect to physiological saline solution, absorption capacity with respect to human urine, water-soluble portion, molecular weight of water-soluble portion, durability of swelled gel, amount of back flow, stickiness of gel, and liquid permeability. The results are shown in Table 1.

EXAMPLE 2

An absorbent resin (2) was obtained by following the procedure of Example 1, except that the amount of SHP to be used as a water-soluble chain transfer agent was changed to 0.032 g (0.025 mol % based on monomer).

This absorbent resin (2) was similarly tested. The results are shown in Table 1.

EXAMPLE 3

An absorbent resin (3) was obtained by following the procedure of Example 1, except that the amount of the deionized water to be used was changed to 3 g and the concentration of the monomer (A) to 42%.

This absorbent resin (3) was similarly tested. The results are shown in Table 1.

EXAMPLE 4

An aqueous monomer solution having a monomer concentration of 40% and a neutralization ratio of 75% was obtained from 21.6 g of acrylic acid, 228.6 g of an aqueous 37 wt % sodium acrylate solution, 0.37 g of N,N'-methylenebisacrylamide (0.2 mol % based on monomer), 0.270 g of thiomalic acid (0.15 mol % based on monomer) as a water-soluble chain transfer agent (C), and 15.5 g of deionized water. This aqueous monomer solution was deprived of dissolved oxygen by dissolving 0.2 g of potassium persulfate therein and blowing nitrogen gas therein. In a four-neck separable flask having an inner volume of 2 liters and provided with a stirrer, a reflux condenser, a thermometer, a nitrogen gas inlet, and a dropping funnel, 1 liter of n-hexane was placed, 4.0 g of sucrose fatty acid ester (HLB 6; produced by Daiichi Seiyaku Co., Ltd. and marketed under trademark designation of "DK-Ester F-50") was added thereto as a dispersant and dissolved therein, and nitrogen gas was blown therein to expel dissolved oxygen therefrom.

Then, the aqueous monomer solution mentioned above was added to the aforementioned separable flask and stirred at 230 rpm and dispersed in the solution. Then, the resultant solution was heated to 65° C. to start polymerization reaction and held at this temperature for two hours to complete the polymerization. The resultant polymerization solution was azeotropically dehydrated to remove the substantial part of the water content, then filtered, and further dried at 100° C. under a vacuum to obtain an absorbent resin (4).

This absorbent resin (4) was similarly tested. The results are shown in Table 1.

EXAMPLE 5

An aqueous monomer (A) solution having a monomer concentration of 37% and a neutralization ratio of 75% was obtained from 414 g of acrylic acid, 4,380 g of an aqueous 37 wt % sodium acrylate solution, 8.815 g of trimethylolpropane triacrylate (0.1 mol % based on monomer) as a cross-linking agent (B), 0.195 g of SHP (0.008 mol % based on monomer) as a water-soluble chain transfer agent (C), and 670 g of deionized water. This aqueous monomer solution was deprived of dissolved oxygen by blowing nitrogen gas therein.

A jacketed stainless steel twin-arm type kneader having an inner volume of 10 liters and provided with two sigma type blades was stoppered. The aqueous monomer solution mentioned above was fed into this reaction vessel and nitrogen gas was blown therein to displace the air entrapped therein with the nitrogen gas. Then, the two sigma type blades were set rotating and the jacket was heated by passing hot water at 35° C. there through and, in the meantime, 2.62 g of ammonium persulfate and 0.12 g of sodium hydrogen sulfite were added as polymerization initiators to the aqueous monomer solution to start polymerization. During the peak period of the polymerization, the hydrated gel polymer was in the state of finely divided powder having a diameter of about 5 mm. The stirring of the polymerization mixture was further continued. On elapse of 60 minutes following the start of the polymerization, the lid was removed from the kneader and the formed gel was removed. The particles of the hydrated gel polymer consequently obtained were spread on a metallic gauze of 50 mesh and dried thereon with hot air at 170° C. for 50 minutes. The dried product was finely pulverized with a hammer type pulverizer and passed through a 20-mesh metallic gauze to obtain an absorbent resin (5) of 20-mesh pass.

The absorbent resin (5) was similarly tested. The results are shown in Table 1.

EXAMPLE 6

An absorbent resin (6) was obtained by following the procedure of Example 5, except that the amount of SHP to be used as a water-soluble chain transfer agent (C) was changed to 1.219 g (0.05 mol % based on monomer).

This absorbent resin (6) was similarly tested. The results are shown in Table 1.

EXAMPLE 7

An absorbent resin (7) was obtained by following the procedure of Example 5, except that 21.968 g of polyethylene glycol diacrylate (n=8) (0.2 mol % based on monomer) was used as a cross-linking agent (B) and the amount of SHP to be used as a water-soluble chain transfer agent (C) was changed to 2.44 g (0.1 mol % based on monomer).

This absorbent resin (7) was similarly tested. The results are shown in Table 1.

EXAMPLE 8

An absorbent resin (8) was obtained by following the procedure of Example 8, except that 54.97 g of polyethylene glycol diacrylate (n=8) (0.5 mol % based on monomer) was used as a cross-linking agent (B) and the amount of SHP to be used as a water-soluble chain transfer agent (C) was changed to 9.76 g (0.4 mol % based on monomer).

This absorbent resin was similarly tested. The results are shown in Table 1.

EXAMPLE 9

An absorbent resin (9) was obtained by following the procedure of Example 5, except that 2.152 g of N,N'-methylenebisacrylamide (0.08 mol % based on monomer) was used as a cross-linking agent (B) and 3.45 g of thiomalic acid (0.1 mol % based on monomer) was used as a water-soluble chain transfer agent (C).

This absorbent resin (9) was similarly tested. The results are shown in Table 1.

EXAMPLE 10

An absorbent resin (10) was obtained by following the procedure of Example 5, except that the amount of the deionized water to be used was changed to 50 g, the concentration of the aqueous monomer (A) solution was changed to 42%, 17.07 g of polyethylene glycol diacrylate (n=14) (0.1 mol % based on monomer) was used as a cross-linking agent (B), and the amount of the thiomalic acid to be used as a water-soluble chain transfer agent (C) was changed to 0.69 g (0.02 mol % based on monomer).

This absorbent resin (10) was similarly tested. The results are shown in Table 1.

EXAMPLE 11

In a reaction vessel provided with a stirring rod, a nitrogen inlet, and a thermometer, 40 g of indian corn starch and 600 g of deionized water were placed, stirred therein at 55° C. for one hour, and then cooled. An aqueous monomer solution having a monomer concentration of 33% and a neutralization ratio of 0% was obtained by dissolving 300 g of acrylic acid, 1.92 g of N,N'-methylenebisacrylamide (0.3 mol % based on monomer) as a cross-linking agent (B), and 0.94 g of thiomalic acid (0.15 mol % based on monomer) was a water-soluble chain transfer agent (C) in the aqueous starch solution prepared as described above.

This aqueous monomer solution and 0.20 g of sodium persulfate and 0.04 g of 1-ascorbic acid added thereto as polymerization initiators were stirred at 35° C. for three hours to induce polymerization and produce a hydrated gel. The hydrated gel was neutralized to 70% by the addition thereto of 389 g of an aqueous 30 wt % caustic soda solution. The neutralized gel was dried and pulverized in the same manner as in Example 1, to produce an absorbent resin (11).

This absorbent resin (11) was similarly tested. The results are shown in Table 1.

EXAMPLE 12

An absorbent resin (12) was obtained by blending 100 parts by weight of the absorbent resin (1) obtained in Example 1 with a mixed composition comprising 1 part by weight of glycerin, 6 parts by weight of water, and 4 parts by weight of methanol and heat-treating the resultant blend at a temperature of 190° C. for one hour.

The absorbent resin (12) thus obtained was chemically analyzed. The results are shown in Table 1.

EXAMPLE 13

An absorbent resin (13) was obtained by stirring and suspending 100 parts by weight of the absorbent resin (2) obtained in Example 2 in 200 parts by weight of cyclohexane, separately preparing a dispersed hydrophilic cross-linking agent by stirring 20 parts by weight of cyclohexane with 0.5 part by weight of sorbitan monolaurate, 0.07 part by weight of polyethylene glycol diglycidyl ether as a hydrophilic cross-linking agent, and 2 parts by weight of water, adding the dispersion to the suspension of the absorbent resin (2) mentioned above, allowing the resultant mixture to stand at 72° C. for two hours, and then filtering the heated mixture.

The absorbent resin (13) thus obtained was chemically analyzed. The results are shown in Table 1.

EXAMPLE 14

An absorbent resin (14) was obtained by mixing 100 parts by weight of the absorbent resin (5) obtained in Example 5 with 0.1 part by weight of ethylene glycol diglycidyl ether, 5 parts by weight of water, and 1 part by weight of isopropyl alcohol and heat-treating the resultant mixture in a drier at 100° C. for 30 minutes.

The absorbent resin (14) thus obtained was chemically analyzed. The results are shown in Table 1.

EXAMPLE 15

An absorbent resin (15) was obtained by mixing 100 parts by weight of the absorbent resin (6) obtained in example 6 with 1 part by weight of glycerol, 6 parts by weight of water, and 1 parts by weight of acetone, placing the resultant mixture in a blender having a jacket thereof heated to 130° C. with a heat medium, and mixing and heat-treating the mixture.

The absorbent resin (15) thus obtained was chemically analyzed. The results are shown in Table 1.

EXAMPLE 16

An absorbent resin (16) was obtained by mixing 100 parts by weight of the absorbent resin (7) obtained in Example 7 with a treating liquid comprising 0.1 part by weight of ethylene glycol diglycidyl ether, 3 parts by weight of water, and 6 parts by weight of methanol in a mixer and heat-treating the resultant mixture in a drier at 130° C. for one hour.

The absorbent resin (16) thus obtained was chemically analyzed. The results are shown in Table 1.

EXAMPLE 17

An absorbent resin (17) was obtained by mixing 100 parts by weight of the absorbent resin (9) obtained in Example 8 with a treating liquid comprising 1 part by weight of aluminum sulfate, 1 part by weight of glycerin, and 8 parts by weight of water in a mixer, and heat-treating the mixture in a drier at a temperature of 200° C. for 30 minutes.

The absorbent resin (17) thus obtained was chemically analyzed. The results are shown in Table 1.

CONTROL 1

An absorbent resin (1) for comparison was obtained by following the procedure of Example 1, except that the use of the cross-linking agent (B) was omitted.

The absorbent resin (1) for comparison thus obtained was chemically analyzed. The results are shown in Table 1.

CONTROL 2

An absorbent resin (2) for comparison was obtained by following the procedure of Example 1, except that the amount of the cross-linking agent (B) to be used was changed to 0.0056 g (0.003 mol % based on monomer).

The absorbent resin (2) for comparison thus obtained was chemically analyzed. The results are shown in Table 1.

CONTROLS 3 TO 5

Absorbent resins (3) to (5) for comparison were obtained by following the procedure of Example 1, except that the use of the water-soluble chain transfer agent (C) was omitted and the amount of the cross-linking agent (B) to be used was changed respectively to 0.0148 g (0.008 mol % based on monomer), 0.0925 g (0.05 mol % similarly), and 0.370 g (0.2 mol % similarly).

The absorbent resins (3) to (5) for comparison thus obtained were chemically analyzed. The results are shown in Table 1.

CONTROL 6

An absorbent resin (6) for comparison was obtained by following the procedure of Example 5, except that the addition of the water-soluble chain transfer agent (C) was omitted.

The absorbent resin (6) for comparison thus obtained was chemically analyzed. The results are shown in Table 1.

CONTROL 7

An absorbent resin (7) for comparison was obtained by following the procedure of Example 5, except that the addition of the water-soluble chain transfer agent (C), SHP, was omitted and the amount of the cross-linking agent (B) to be used was decreased to half, 3.41 g (0.05 mol % based on monomer).

The absorbent resin (7) thus obtained was chemically analyzed. The results are shown in Table 1.

CONTROLS 8 TO 11

Absorbent resins (8) to (11) for comparison were obtained by subjecting the absorbent resins (1) to (4) obtained respectively in Controls 1 to 4 to the procedure of Example 13.

The absorbent resins (8) to (11) for comparison thus obtained were chemically analyzed. The results are shown in Table 1.

CONTROLS 12 AND 13

Absorbent resins (12) and (13) for comparison were obtained by subjecting the absorbent resins (6) and (7) for comparison obtained respectively in Controls 6 and 7 to the procedure of Example 16.

The absorbent resins (12) and (13) for comparison thus obtained were chemically analyzed. The results are shown in Table 1.

TABLE 1

| Absorbent resin | Cross-linking agent | Amount of Cross-linking agent (mol %) | Chain transfer agent | Amount of chain transfer agent (mol %) | Absorption capacity to P.S. | Absorption capacity human urine (g/g) | Ropi-ness of gel | Soluble content (%) | M.W. of Soluble content (×10,000) | l.p to human urine (sec.) | Durability 6 h/12 h/ 18 h | Return content |
|---|---|---|---|---|---|---|---|---|---|---|---|---|
| Absorbent resin | | | | | | | | | | | | |
| (1) | MBAA | 0.05 | SHP | 0.05 | 60 | 38 | Δ~○ | 17.5 | 18 | 50 | ○/○/Δ~○ | 4.3 |
| (2) | MBAA | 0.05 | SHP | 0.025 | 55 | 37 | Δ~○ | 13.5 | 23 | 40 | ○/○/○ | 6.5 |
| (3) | MBAA | 0.05 | SHP | 0.05 | 57 | 36 | Δ~○ | 16.3 | 21 | 40 | ○/○/○ | 5.2 |
| (4) | MBAA | 0.2 | thiomalic acid | 0.15 | 52 | 33 | ○ | 12.7 | 4 | 30 | ○/○/Δ~○ | 6.1 |
| (5) | TMPT | 0.1 | SHP | 0.008 | 43 | 34 | ○ | 5.8 | 9 | 20 | ○/○/○ | 5.8 |
| (6) | TMPT | 0.1 | SHP | 0.05 | 54 | 36 | ○ | 13.8 | 9 | 30 | ○/○/Δ~○ | 7.7 |
| (7) | PEGDA | 0.2 | SHP | 0.1 | 52 | 34 | ○ | 14.6 | 2 | 20 | ○/○/○ | 8.8 |
| (8) | PEGDA | 0.5 | SHP | 0.4 | 43 | 30 | ○ | 15.1 | 1 | 20 | ○/○/○ | 8.1 |
| (9) | MBAA | 0.06 | thiomalic acid | 0.1 | 49 | 36 | ○ | 12.1 | 10 | 20 | ○/○/Δ~○ | 6.6 |
| (10) | PEGDA | 0.1 | thiomalic acid | 0.02 | 40 | 33 | ○ | 2.9 | 7 | 20 | ○/○/○ | 6.4 |
| (11) | MBAA | 0.3 | thiomalic acid | 0.15 | 41 | 31 | ○ | 3.8 | 3 | 10 | ○/○/○ | 8.8 |
| Surface treated product of Example | | | | | | | | | | | | |
| (12) | | | 1 | | 55 | 40 | ○ | 16.1 | 17 | 20 | ○/○/○ | 3.8 |
| (13) | | | 2 | | 52 | 39 | ○ | 12 | 22 | 20 | ○/○/○ | 4 |
| (14) | | | 5 | | 41 | 36 | ○ | 5.3 | 8 | max. 10 | ○/○/○ | 3.3 |
| (15) | | | 6 | | 51 | 38 | ○ | 13.1 | 8 | max. 10 | ○/○/○ | 3.9 |
| (16) | | | 7 | | 50 | 35 | ○ | 14 | 2 | max. 10 | ○/○/○ | 4.1 |
| (17) | | | 9 | | 48 | 36 | ○ | 11.1 | 8 | max 10 | ○/○/○ | 4.1 |
| Absorbent resin for comparison | | | | | | | | | | | | |
| (1) | no | no | SHP | 0.05 | 85 | 8 | X | 38.8 | 93 | min. 60 | X/X/X | 14.6 |
| (2) | MBAA | 0.003 | SHP | 0.05 | 68 | 19 | X | 22.1 | 84 | min. 60 | Δ/X/X | 16.3 |
| (3) | MBAA | 0.008 | no | 0 | 60 | 26 | Δ | 17.2 | 68 | min. 60 | Δ/Δ/Δ~X | 11.2 |
| (4) | MBAA | 0.05 | no | 0 | 45 | 25 | Δ | 6.2 | 18 | 60 | ○/○/Δ~○ | 10.5 |
| (5) | MBAA | 0.2 | no | 0 | 22 | 18 | ○ | 2.8 | 4 | 40 | ○/○/○ | 25 |
| (6) | TMPT | 0.1 | no | 0 | 36 | 21 | ○ | 5.2 | 9 | 50 | ○/○/○ | 13.5 |
| (7) | TMPT | 0.05 | no | 0 | 43 | 20 | Δ~○ | 6.2 | 8 | 60 | ○/Δ~X/Δ | 18.3 |
| Surface treated product of Control | | | | | | | | | | | | |
| (8) | | | 1 | | 65 | 19 | Δ | 36.1 | 90 | min. 60 | ○/Δ~○/X | 11.3 |
| (9) | | | 2 | | 61 | 18 | Δ | 21.6 | 81 | 60 | ○/Δ~X/X | 12.5 |
| (10) | | | 3 | | 55 | 24 | Δ | 16.1 | 66 | 60 | ○/○/Δ~○ | 10.2 |
| (11) | | | 4 | | 40 | 22 | ○ | 6 | 17 | 50 | ○/○/Δ~○ | 14.6 |
| (12) | | | 6 | | 34 | 24 | ○ | 5 | 8 | 30 | ○/○/○ | 13 |
| (13) | | | 7 | | 39 | 21 | ○ | 5.2 | 8 | 30 | ○/○/Δ~○ | 15.1 |

MBAA: N,N'-methylene bisacrylamide
TMPT: Trimethylolpropane triacrylate
PEGDA: Polyethylene glycol diacrylate (n = 8, or 14)
KPS: Potassium persulfate
P.S.: physiological saline
SHP: Sodium hypophosphite monohydrate

What is claimed is:

1. A method for the production of (D) an absorbent resin excelling in durability, which method comprises polymerizing (A) 30% by weight to saturated concentration of an aqueous water-soluble ethylenically unsaturated monomer solution containing as a main component an acrylic acid, a salt thereof or mixtures thereof, (B) 0.02 to 1 mol % of a cross-linking agent having at least two polymerically unsaturated groups and (C) 0.001 to 1 mol % of a hypophosphite, both based on the amount of said monomer (A).

2. A method according to claim 1, wherein the concentration of said water-soluble ethylenically unsaturated monomer (A) in said aqueous solution is in the range of 35% by weight to saturated concentration.

3. A method according to claim 1, wherein the aqueous solution of said water-soluble ethylenically unsaturated monomer (A) is subjected to polymerization in a reaction vessel provided with stirring.

4. A method according to claim 1, wherein said polymerization is carried out in the form of reversed-phase suspension polymerization, in the presence of a dispersant dispersed in a polymerically inactive hydrophobic organic solvent.

5. A method according to claim 4, wherein a nonionic surfactant having a HLB in the range of 2 to 7 is used as a dispersant.

6. A method according to claim 5, wherein said nonionic surfactant is a sorbitan fatty acid ester.

7. A method for the production of (F) an absorbent resin excelling in durability, which method comprises polymerizing (A) 30% by weight to saturated concentration of an aqueous water-soluble ethylenically unsaturated monomer solution containing as a main component an acrylic acid, a salt thereof or mixture thereof, (B) 0.02 to 1 mol % of a cross-linking agent having at least two polymerically unsaturated groups and (C) 0.001 to 1 mol % of a hypophosphite, both based on the amount of said monomer (A) in the presence of a radical polymerization initiator thereby preparing (D) an absorbent resin, and cross-linking with (E) a hydrophilic cross-linking agent capable of reacting with the functional group of said absorbent resin.

8. A method according to claim 7, wherein the aqueous solution of said water-soluble ethylenically unsaturated monomer (A) is subjected to polymerization in a reaction vessel provided with stirring.

9. A method according to claim 7, wherein (A) said water-soluble ethylenically unsaturated monomer is polymerized in a reversed phase suspension in the presence of a dispersant dispersed in a polymerization inactive hydrophobic organic solvent.

10. A method according to claim 7, wherein said cross-linking is effected by mixing 100 parts by weight of (D) said absorbent resin obtained by the polymerization of (A) said water-soluble ethylenically unsaturated monomer with 0.005 to 5 parts by weight of (E) at least one hydrophilic cross-linking agent selected from the group consisting of (E-1) compounds possessed of at least two functional groups capable of reacting with a carboxyl group and (E-2) polyvalent metal salts and heating the resultant mixture.

11. A method according to claim 10, wherein said hydrophilic cross-linking agent (E) is a compound (E-1).

12. A method according to claim 10, wherein said compound (E-1) is at least one member selected from the group consisting of polyhydric alcohol compounds, polyglycidyl ether compounds, and polyamine compounds.

13. A process for producing a substantially water-insoluble, highly water-absorptive polymer which comprises subjecting a 30% by weight to saturated concentration of an aqueous solution of a monomer comprising as a main component acrylic acid and/or its alkali metal salt to polymerization conditions effective for producing water-insoluble, water absorptive polymer, the improvement comprising effecting said polymerization in the presence of from 0.001 to 1 mol % of one hypophosphite and from 0.02 to 1 mol % of a cross-linking agent, both based on the amount of said monomer.

* * * * *